No. 745,797. PATENTED DEC. 1, 1903.
W. CROSS.
COMBINED FEED WATER HEATER, CIRCULATOR, AND SCUMMER.
APPLICATION FILED AUG. 28, 1903.
NO MODEL. 2 SHEETS—SHEET 2.
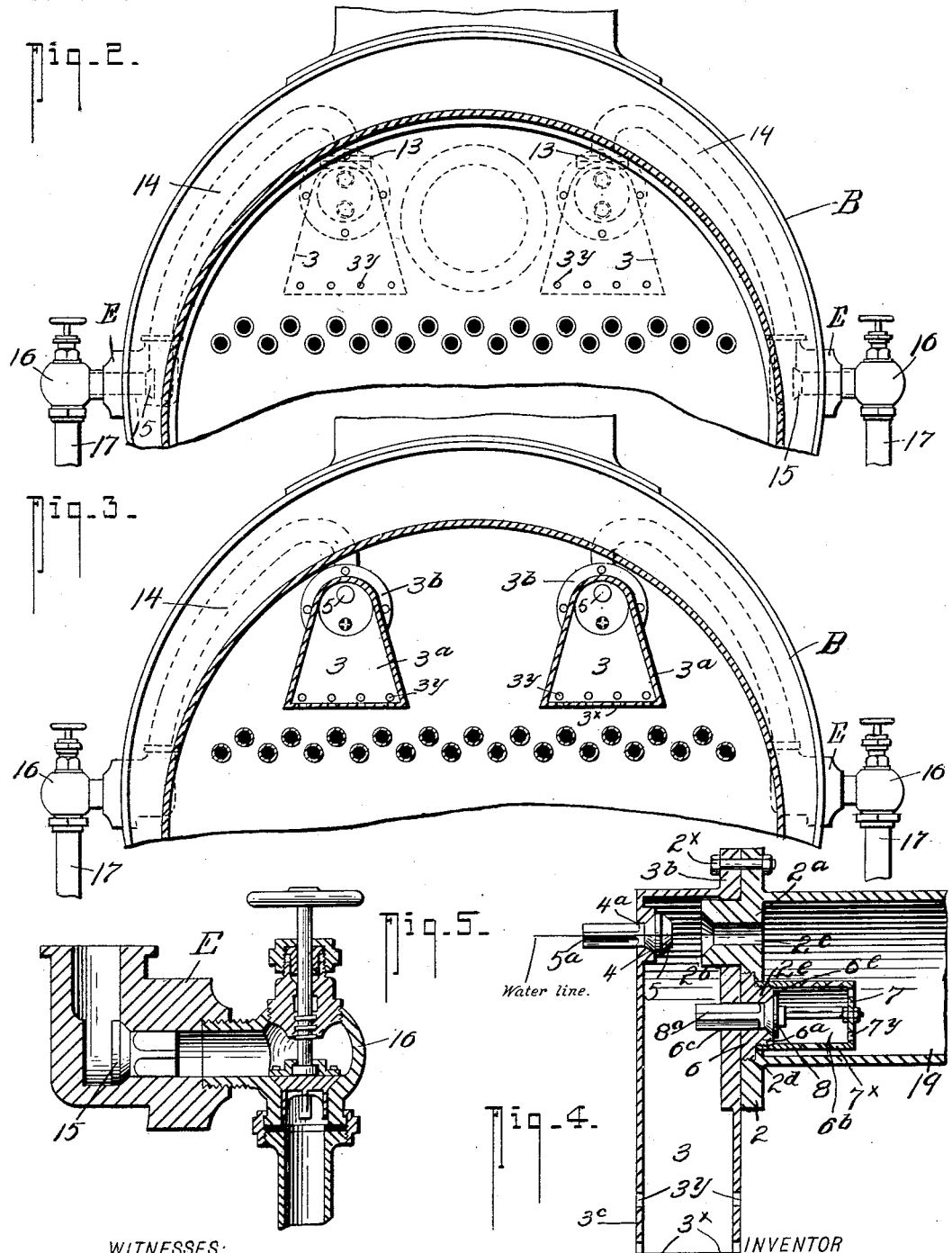
WITNESSES:
F. C. Gibson.
John J. Schott
INVENTOR
William Cross.
BY
Fred G. Dieterich Co.
ATTORNEYS No. 745,797. Patented December 1, 1903.

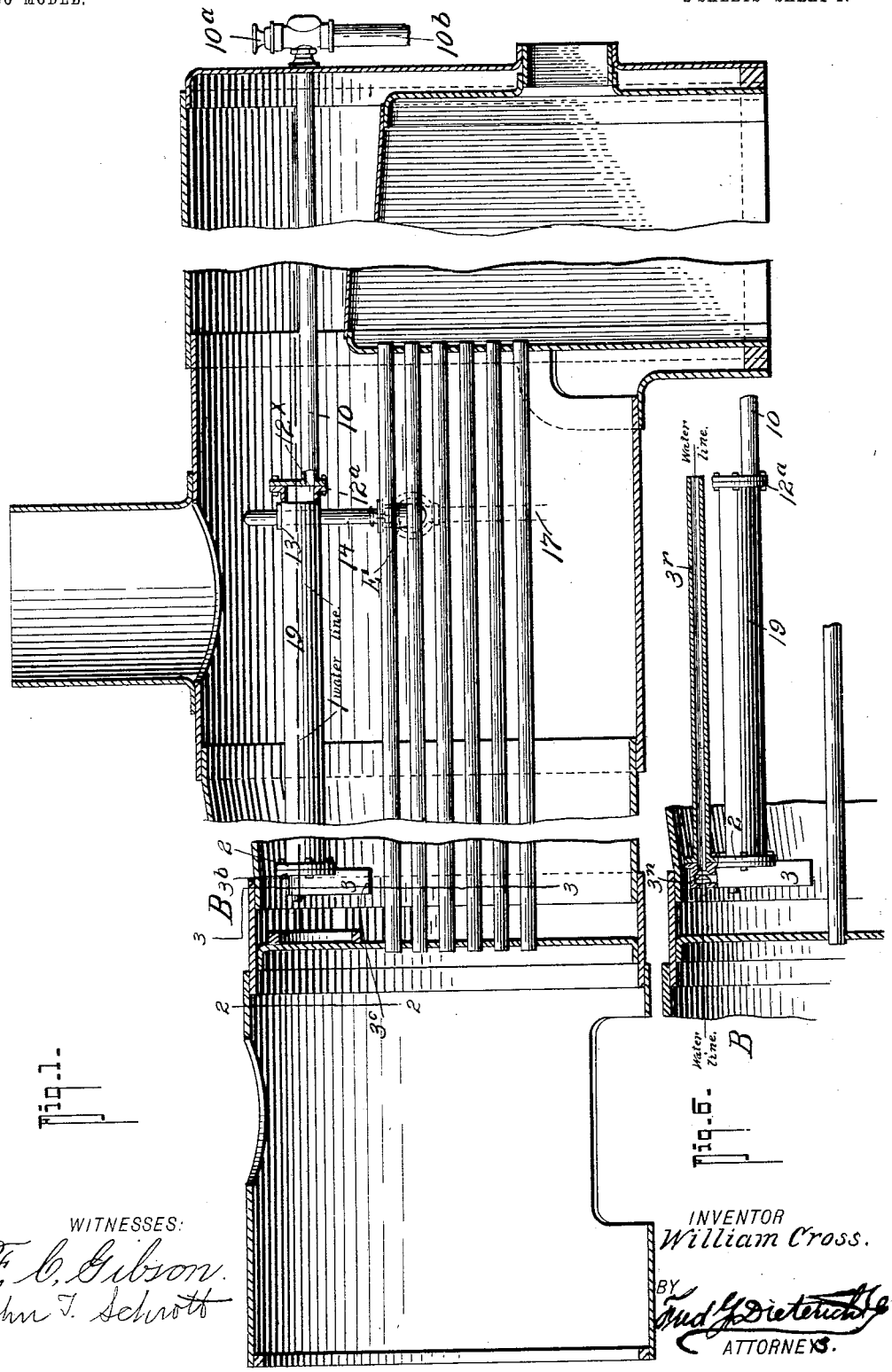

UNITED STATES PATENT OFFICE.

WILLIAM CROSS, OF MONTREAL, CANADA.

COMBINED FEED-WATER HEATER, CIRCULATOR, AND SCUMMER.

SPECIFICATION forming part of Letters Patent No. 745,797, dated December 1, 1903.

Application filed August 28, 1903. Serial No. 171,102. (No model.)

*To all whom it may concern:*

Be it known that I, WILLIAM CROSS, residing at West Montreal, in the county of Hochelaga, Province of Quebec, and Dominion of Canada, have invented certain new and useful Improvements in a Combined Feed-Water Heater, Circulator, and Scummer, of which the following is a specification.

This invention relates to that class of boiler-feed-water mechanism in which the feed-water is heated before it passes into the boiler proper to mingle with the water therein; and the invention primarily seeks to provide a device of this character of a very simple, effective, and economical construction which will quickly and effectively serve its intended purpose.

Again, my invention seeks to provide a device of the character stated in which the scum and impurities from the feed-water are automatically removed, thereby insuring a feed of pure clear water to the boiler.

With other objects in view, which will be hereinafter made apparent, my invention consists in the peculiar arrangement and novel combination of parts, such as will be hereinafter fully described and then specifically pointed out in the appended claims, reference being had to the accompanying drawings, in which—

Figure 1 is a vertical longitudinal section of a portion of the locomotive-boiler with my invention applied. Fig. 2 is a cross-section on the line 2 2 of Fig. 1. Fig. 3 is a similar view on the line 3 3 of Fig. 1. Fig. 4 is a detail view of the sprayer and a portion of the scumming-chamber. Fig. 5 is a detail view of the injector-check and its coöperating check-valve. Fig. 6 is a detail view of a modified form of my invention, hereinafter specifically referred to.

Referring now to the accompanying drawings, in which like numerals and letters of reference indicate like parts in all of the figures, 1 represents what I term a "scumming-chamber" or "scum-collector," which consists of a large tubular member 19, running practically the entire length of the boiler B, which boiler, as shown in the drawings, may be of the ordinary locomotive type, since the same forms no part of my invention. At the extreme forward end of the scum-collecting chamber 1 the said chamber has a flange 2 and a head $2^a$, to which is removably secured, by bolts $2^x$ or otherwise, the sprayer 3, shown in detail in Fig. 4, by reference to which it will be seen that the sprayer 3 consists of a triangular-shaped chamber $3^a$ in cross-section, having an integrally-formed flange $3^b$, by which the said sprayer 3 is bolted onto the scumming-chamber flange 2, as shown.

Integrally formed within the chamber $3^a$, and near the top thereof, is a valve-seat 4, having an aperture $4^a$ therethrough, through which passes a stem $5^a$ of the two-way valve 5 for a purpose presently to appear. Formed integral with the head $2^a$ of the scumming-chamber 1 and in alinement with the valve-seat 4 is a valve-seat $2^b$, having an aperture $2^c$, and the said valve 5 is adapted to seat on the said valve-seat 4 at predetermined times and in a manner presently explained.

At a point near the bottom of the scumming-chamber the head $2^a$ has a threaded aperture $2^d$, having a slightly-contracted portion $2^e$ to receive the valve-carrying member 6, with its valve-guard 7, as shown in detail in Fig. 4, and the said valve-guard 7 is screwed or otherwise secured to the hub $6^a$ of the valve-carrying member 6, which member 6 has a valve-seat $6^a$ and an aperture $6^c$, in which the valve-stem $8^a$ of the check-valve 8 is adapted to slide. The valve-guard 7 has a series of circumferentially-arranged inwardly-slanting apertures $7^x$ and a series of apertures $7^y$ in its ends for the purposes presently to appear.

The lower end $3^c$ of the sprayer 3 is of a greater area in horizontal section than the upper end, and the said lower end has a series of apertures $3^x$ in its bottom wall and a series of apertures $3^y$ in its side walls, whereby the injected water will be dissipated throughout a large area and assist in maintaining a circulation of water within the boiler.

Bolted or otherwise secured to the head $12^a$ of the scumming-chamber 1 is a scum-offtake pipe 10, which communicates with the scumming-chamber through apertures $12^x$ near the bottom of the head $12^a$. Near the end to which the pipe 10 joins the scumming-chamber is a flange 13, on the top thereof, to which is secured the injector delivery-pipe 14, which has a check-valve 15 at its inlet end within the valve B. (See Fig. 2.) 16 designates the injector check or cut-off valve, which connects with the delivery-pipe 14 through the check-valve 15 and with which the feed-pipe 17 from the injector (not shown) connects.

At the outlet end of the scum-offtake pipe 10 is a cut-off valve $10^a$, which joins with the discharge-pipe $10^b$, as clearly shown in Fig. 1.

So far as described the manner in which my invention operates can best be explained as follows: Assuming the valve $10^a$ to be closed and it is desired to inject water into the boiler, the operator opens the valve 16 to permit the water to be admitted into the scumming-chamber 1 from the injector. As the water traverses the scumming-chamber it is heated to nearly the same temperature as that of the water already in the boiler, and in process of heating the water deposits its solid matter in the scumming-chamber. From the scumming and heating chamber the water, opening the valve 5, flows through the aperture $2^c$ into the sprayer 3, from which it passes through the apertures therein in the form of spray into the water already in the boiler. By feeding the new water into the water already in the boiler in the manner described, below the water-line thereof, the water in the boiler is caused to circulate around the sprayer, and thereby insures the new water becoming thoroughly intermixed with the old water, and as the new water when it flows out of the sprayer is of practically the same temperature as the water already in the boiler the temperature of the water in the boiler will not be reduced as the new water is admitted thereto. Owing to its freedom from impurities, high temperature, location at the upper surface of the water in the boiler at a point most remote from the action of the fire, and by discharging it as a spray the feed-water goes easily into circulation and all danger of leakage is prevented. When the desired quantity of water has been fed into the boiler, the operator closes the valve 16 and opens the discharge-valve $10^c$. The steam-pressure within the boiler then causes the valve 5 to seat on the valve-seat $2^b$ to close the aperture $2^c$, and at the same time the steam enters the chamber $3^a$ and forces open the valve 8, which permits the steam to pass out through the valve-guard $6^b$ and blow out the sediment and scum in the scumming-chamber through the scum-offtake pipe to the atmosphere. It should be understood, however, that during the feeding of water to the boiler the valve 8 is closed. By providing the valve-guard $6^b$ with apertures, as shown, the steam will be expelled in the form of jets into the scumming-chamber, which will materially assist in removing any material which may be clinging to the scumming-chamber walls, and thereby clean the scumming-chamber after the water has been fed to the boiler.

To prevent an accidental back flow of the feed-water during the filling of the boiler owing to any mishap or injury to the injector or the injector delivery-pipe while the valve 16 is open, I provide a back-check 15, as shown.

From the foregoing it will be seen the pressure of the water entering the boiler will open the valve 5, which will automatically close when the pressure of the steam acts upon it when valve $10^a$ is open, and the valve 8 will automatically close when injector-pressure is upon it on scumming-chamber sides and open when steam-pressure is upon its sprayer side.

From the foregoing description it will be seen that I provide a device of this character by which the temperature of the feed-water is raised approximately to that of the water already in the boiler and which will produce a circulation of the water under evaporation free from the evils that lead to the contraction of the boilers, plates, tubes, &c., and prevent the circulation of water of different temperatures and at the same time purify the water before it is combined with the water already in the boiler.

From the foregoing description, taken in connection with the accompanying drawings, it is thought the advantages and complete operation of my invention will be readily apparent to those skilled in the art to which it appertains.

From the foregoing it will be seen the pressure of the water entering the boiler when the valve 16 is opened will force the valve 5 open to permit the water to flow out through the valve-seat aperture $2^c$ into the chamber 3 and at the same time force the valve 8 to close upon its seat. As soon as the valve 16 is closed and the valve $10^a$ opened the steam-pressure within the boiler will force the valve 5 on its seat $2^b$ to again close the aperture $2^c$. Any scum which may be on the surface of the water in the boiler will enter through the aperture together with the steam and flows upon the valve 8, passing through the valve-passage $6^c$ and through the apertures in the guard $6^b$ into the scumming-chamber and drive out the deposited scum and solid matter from the scumming-chamber and through the scum-offtake pipe into the atmosphere.

From experience I have found wherever feed-water carrying solid matter deposits the impurity it contains therefore the feed-water is discharged into the scumming-chamber from the top in order to assist this deposition by the power of gravitation as much as possible.

Having thus described my invention, what I claim, and desire to secure by Letters Patent, is—

1. A feed-water mechanism of the character stated, comprising in combination with a boiler, of a feed-water heater and purifier including a scumming-chamber running lengthwise of the boiler, an outlet member at one end thereof adapted to deliver the feed-water to the boiler below the water-line thereof in the form of spray, an inlet-pipe for feeding said feed-water into the scumming-chamber at the end opposite the outlet member to permit said water to become heated and deposit its impurities into the scumming-chamber before it passes out of the outlet member, means for automatically removing said impurities from said scumming-chamber after the feed-water has been turned off, for the purposes described.

2. A feed-water mechanism of the character stated, comprising in combination with a boiler, of a feed-water heater and purifier including a scumming-chamber running lengthwise of the boiler, an outlet member at one end thereof adapted to deliver the feed-water to the boiler below the water-line thereof in the form of spray, an inlet-pipe for feeding said feed-water into the scumming-chamber at the end opposite the outlet member to permit said water to become heated and deposit its impurities into the scumming-chamber before it passes out of the outlet member, means for removing said impurities from said scumming-chamber after the feed-water has been turned off, said means including a scum-offtake pipe connected to the end of the scumming-chamber at which the feed-water enters, for the purposes described.

3. A feed-water mechanism of the character stated, comprising in combination with a boiler, of a feed-water heater and purifier including a scumming-chamber running lengthwise of the boiler, an outlet member at one end thereof adapted to deliver the feed-water to the boiler below the water-line thereof in the form of spray, an inlet-pipe for feeding said feed-water into the scumming-chamber at the end opposite the outlet member to permit said water to become heated and deposit its impurities into the scumming-chamber before it passes out of the outlet member, means for removing said impurities from said scumming-chamber after the feed-water has been turned off, said means including a scum-offtake pipe connected to the end of the scumming-chamber at which the feed-water is admitted, and a sprayer device within said scumming-chamber at the feed-water outlet end so that the walls of the scumming-chamber are cleaned during the process of removing the contents of the scumming-chamber after the feed-water has been turned off, for the purposes described.

4. A feed-water mechanism of the character stated comprising in combination with a boiler, of a feed-water heater and purifier including a scumming-chamber running lengthwise of the boiler, and disposed above the water-line thereof, an outlet member at one end adapted to deliver the feed-water to the boiler below the water-line thereof in the form of spray, an inlet-pipe for feeding said feed-water to the scumming-chamber at the end opposite the outlet member to cause said feed-water to become heated and deposit its impurities within the scumming-chamber, means for automatically removing said impurities from said scumming-chamber after the feed-water has been turned off, for the purposes specified.

5. A device of the character stated, a scumming-chamber having a feed-water outlet at one end consisting of a longitudinally-disposed pipe arranged in the steam-zone of the boiler, a delivery member detachably connected to one end of the scumming-chamber and adapted to deliver the feed-water to the boiler below the water-line thereof in the form of spray, means for feeding the feed-water into the delivery member at the top thereof, said means including a two-way check-valve, a scum-offtake pipe and a feed-water inlet-pipe connected to the scumming-chamber at the other end, a valve for shutting off the supply of feed-water to the scumming-chamber, a valve for closing the delivery end of the scum-offtake pipe, said two-way check-valve being adapted to close said scumming-chamber outlet when the feed-water supply is cut off and the scum-offtake-pipe delivery end and to admit steam to the delivery member, means for admitting steam in the form of spray to the scumming-chamber at the bottom thereof at predetermined times, for the purposes described.

6. A device of the character stated, a scumming-chamber having a feed-water outlet at one end consisting of a longitudinally-disposed pipe arranged in the steam-zone of the boiler, a delivery member detachably connected to one end of the scumming-chamber and adapted to deliver the feed-water to the boiler below the water-line thereof in the form of spray, means for feeding the feed-water into the delivery member at the top thereof, said means including a two-way check-valve, a scum-offtake pipe and a feed-water inlet-pipe connected to the scumming-chamber at the other end, a valve for shutting off the supply of feed-water to the scumming-chamber, a valve for closing the delivery end of the scum-offtake pipe, said two-way check-valve being adapted to close said scumming-chamber outlet when the feed-water supply is cut off and the scum-offtake-pipe delivery end is open and to admit steam to the delivery member, means for admitting steam in the form of spray to the scumming-chamber in the bottom thereof, and at the feed-water-delivery-member end of the scumming-chamber, at predetermined times, said means including a sprayer having a check-valve, for the purposes described.

7. A feed-water mechanism for boilers, comprising in combination with a boiler, of a chamber arranged within the heat-zone of the boiler, a sprayer-outlet joined to one end of the chamber, a scum-offtake pipe, and a water-inlet pipe joined with the other end of the chamber, a valved outlet from the chamber to the sprayer-offtake, and a valve-inlet from the sprayer-offtake to the chamber, check-valves connected to the feed-water inlet-pipe and the scum-offtake pipe, all being arranged substantially as shown and described.

WILLIAM CROSS.

Witnesses:
 THOMAS FEE,
 JOHN SULLIVAN.